United States Patent
Kwiatkowski et al.

(10) Patent No.: US 12,416,325 B2
(45) Date of Patent: Sep. 16, 2025

(54) MOUNTING APPARATUS FOR DYNAMICALLY LOADED STRUCTURAL JOINTS

(71) Applicant: PRATT & MILLER ENGINEERING AND FABRICATION, LLC

(72) Inventors: Kevin R. Kwiatkowski, Ann Arbor, MI (US); Reed Pelly, New Hudson, MI (US); Aaron Ward, Charlotte, NC (US); Steven Reini, Waterford, MI (US); Jason Kremar, Mooresville, NC (US)

(73) Assignee: PRATT & MILLER ENGINEERING AND FABRICATION, LLC, New Hudson, MI (US)

( * ) Notice: Subject to any disclaimer, the term of this patent is extended or adjusted under 35 U.S.C. 154(b) by 287 days.

(21) Appl. No.: 18/069,498

(22) Filed: Dec. 21, 2022

(65) Prior Publication Data

US 2023/0296122 A1    Sep. 21, 2023

Related U.S. Application Data

(63) Continuation-in-part of application No. 15/950,582, filed on Apr. 11, 2018, now abandoned.

(51) Int. Cl.
*F16B 5/02*     (2006.01)
*F16B 5/00*     (2006.01)
*F16B 37/12*    (2006.01)

(52) U.S. Cl.
CPC .......... *F16B 5/0241* (2013.01); *F16B 5/0088* (2013.01); *F16B 5/0225* (2013.01); *F16B 37/125* (2013.01)

(58) Field of Classification Search
CPC ... F41H 5/00; F41H 5/013; F41H 7/04; F16B 5/0088; F16B 5/02; F16B 5/0208; F16B 5/0216; F16B 5/0225; F16B 5/0233; F16B 5/0283; F16B 12/14; F16B 12/22; F16B 12/34; F16B 2012/103; F16B 2012/106
See application file for complete search history.

(56) References Cited

U.S. PATENT DOCUMENTS 3,487,446 A * 12/1969 Hero et al. ........... A47B 95/008
                                                        248/222.41
3,662,805 A *  5/1972 Sygnator .............. F16B 5/0225
                                                        428/116

(Continued)

FOREIGN PATENT DOCUMENTS

DE           566754 C       12/1932
DE   10 2004 050 625   *  4/2006  ............... F16B 5/02

(Continued)

*Primary Examiner* — Michael P Ferguson
(74) *Attorney, Agent, or Firm* — DICKINSON WRIGHT PLLC

(57) ABSTRACT

A mounting structure apparatus for dynamically loaded structure joints is disclosed. The apparatus includes a first member having an aperture through a first surface and communicating with a counterbore in a second surface. A second member is included having a blind bore coaxial with the first member aperture. An insert is engageable with the counter bore, and a fastener is disclosed insertable into the first member aperture and interactive with the second member to join the first member to the second member.

8 Claims, 4 Drawing Sheets

(56) References Cited

U.S. PATENT DOCUMENTS

| | | | |
|---|---|---|---|
| 3,725,993 A | | 4/1973 | Siler |
| 3,777,358 A | | 12/1973 | Matievich et al. |
| 4,021,991 A | | 5/1977 | Hotz |
| 4,043,239 A | * | 8/1977 | DeFusco ............... F16B 5/0233 411/432 |
| 4,127,353 A | | 11/1978 | Busse |
| 4,167,889 A | | 9/1979 | Bohne et al. |
| 4,325,665 A | | 4/1982 | Jukes et al. |
| 4,478,545 A | | 10/1984 | Mizusawa et al. |
| 4,639,161 A | * | 1/1987 | Mazaki ................... F16B 12/20 403/231 |
| 4,655,660 A | | 4/1987 | McGlone et al. |
| 4,982,476 A | * | 1/1991 | Salice ................... E05D 7/0407 16/382 |
| 6,712,573 B1 | | 3/2004 | Huber |
| 6,769,830 B1 | | 8/2004 | Nygren |
| 8,356,954 B2 | | 1/2013 | Koch |
| 8,365,476 B2 | | 2/2013 | Richard et al. |
| 8,646,843 B2 | | 2/2014 | Koch |
| 9,638,491 B2 | | 5/2017 | Challis |
| 10,376,047 B1 | | 8/2019 | Ebbesson |
| 2009/0016807 A1 | | 1/2009 | Koch |
| 2013/0134763 A1 | | 5/2013 | Koch |
| 2015/0368948 A1 | | 12/2015 | Ward |
| 2016/0061561 A1 | | 3/2016 | Challis |

FOREIGN PATENT DOCUMENTS

| | | |
|---|---|---|
| DE | 102011053564 A1 | 3/2013 |
| GB | 2237615 A | 5/1991 |
| GB | 2496613 B | 8/2016 |

* cited by examiner

MOUNTING APPARATUS FOR DYNAMICALLY LOADED STRUCTURAL JOINTS

CROSS-REFERENCE TO RELATED APPLICATIONS

This application is a continuation-in-part of U.S. patent application Ser. No. 15/950,582, filed Apr. 11, 2018, and the entire contents and disclosures of which are incorporated herein by reference.

STATEMENT OF GOVERNMENT INTEREST

This disclosure was made in part with Government support by The United States Department of the Army. The Government has certain rights in the disclosure.

TECHNICAL FIELD

This disclosure relates to improved mounting structures for dynamically loaded structural joints. The mounting structure allows shear strength and tensile strength of a joint to be independently tuned by varying sizes of an engaged counter bore and a fastener.

BACKGROUND

Existing fasteners are limited in creating a joint with improved shear and tensile strength. Traditional joints consisting of a bolt threaded into a nut are limited in the amount of energy they can absorb prior to failure. This is especially important in situations with dynamically loaded structural joints. Dynamically loaded structural joints, such as those formed when jointing armor plating, are subjected to shear and tensile forces. Existing fasteners can also result in a "secondary projectile" when subjected to shear forces that overcome the fastener strength. It is important to be able to accommodate these forces in armored vehicles which may be subjected to blast forces that may overcome existing fasteners.

Improvements to such joints are given in the several embodiments disclosed. In one embodiment, one piece of a structure may be attached to another piece of a structure with a bolt and an insert that is mechanically loaded as a result of translational movement of the two pieces. The insert may be threaded into the main piece of structure, and the insert may have internal threads for attachment, and a shoulder feature that sits on the surface of the main structure. The mating piece of the structure has a counterbore that fits over the shoulder of the insert and transfers load when translation occurs between the two structures.

SUMMARY

According to an exemplary aspect of the present disclosure, a mounting structure apparatus includes a first member having a first surface and a second surface opposite to the first surface, and having an aperture formed through the first surface and a counterbore formed with a circumferential wall in the second surface, the counterbore communicating with the aperture, a second member having a bore facing the second surface of the first member and being coaxial with the aperture of the first member, an insert having a shoulder and also being engageable with the counterbore of the first member and the bore of the second member, and a fastener insertable into the aperture of the first member and coupled with the bore of the second member by engaging the insert to join the first member to the second member. Further, the circumferential wall of the counterbore is formed with a closed shape and configured to move into a direct engagement with a radial end surface of the shoulder in the insert.

According to a further aspect of the present disclosure, the insert forms a threaded bore and external threads, and the external insert threads are engageable with threads in the bore of the second member. Further, the threaded bore engages the fastener. The counterbore of the first member is formed with an oblong shape in a direction defined as X-axis. The aperture of the first member is formed with an elongated slot along the X-axis and a slot length of the aperture is smaller than a length of the counterbore in the X-axis.

According to a further aspect of the present disclosure, the counterbore has a first dimension to accommodate the insert and a second dimension smaller than the first dimension and the second dimension is separated from the first dimension by a length L in a direction defined as X-axis such that the counterbore of the first member is tapered from the first dimension to the second dimension in the X-axis. The second dimension is smaller than a diameter of the insert whereby the insert interferes with the counterbore in the event that the first and second members are relatively moved from each other.

According to another aspect of the present disclosure, a mounting structure apparatus includes a first member having a first surface and a second surface opposite to the first surface, the first member having an aperture being formed through the first surface and communicating with a counterbore of the second surface, a second member having a bore facing the second surface of the first member and being coaxial with the aperture of the first member, an insert having a blind bore and being engageable with the counterbore of the first member and the bore of the second member, and a fastener insertable into the aperture of the first member and coupled with the bore of the second member by engaging the insert to join the first member to the second member. Further, the counterbore of the first member is formed with a tapered slot having a first dimension to accommodate the insert and a second dimension smaller than the first dimension, and the second dimension is separated from the first dimension by a length.

DETAILED DESCRIPTION

All figures and examples herein are intended to be non-limiting; they are mere exemplary iterations and/or embodiments of the claims appended to the end of this description. Modifications to structure, materials, the order of steps in procedures, etc., are contemplated.

Figure 1:
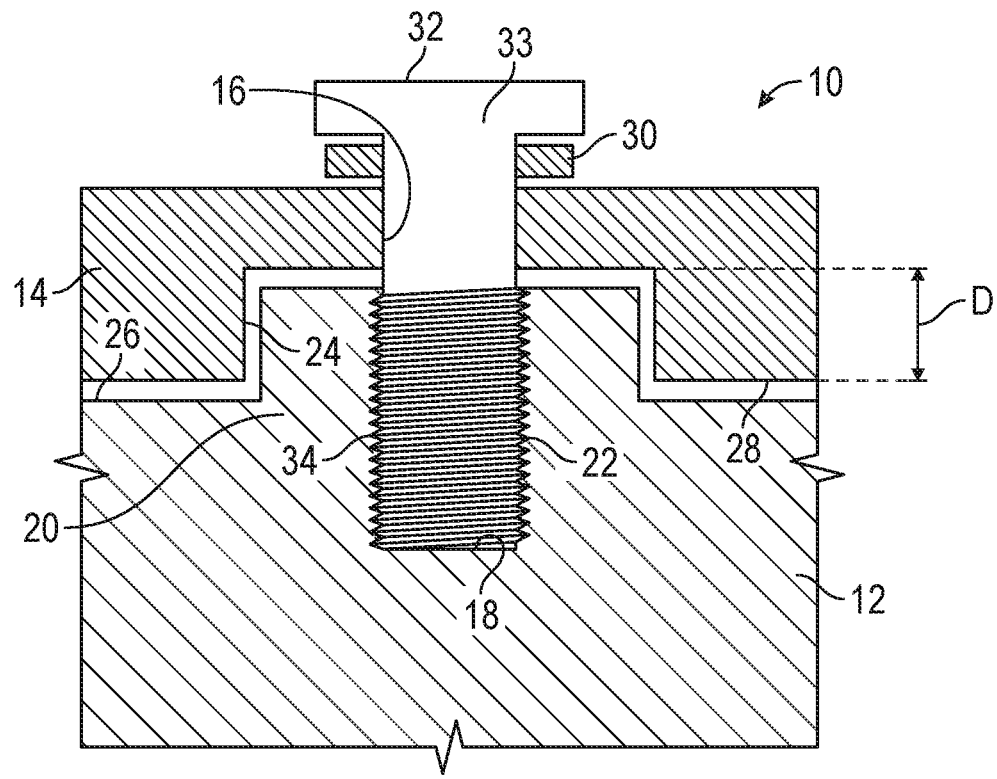
FIG. 1 is a cross-sectional view of one embodiment of the mounting apparatus.

Referring now to the drawings, and particularly to FIG. 1, there is shown a cutaway side view of one embodiment of the mounting apparatus. Specifically, mounting structure 10 is shown joining first plate 12 and second plate 14. Plate 14 is equipped with an aperture 16 extending there through, and oriented to be coaxial and overlie blind bore 18 in plate 12. Member or plate 12 has insert projection 20 which may be threaded with an internal thread 22 in the bore. Plate 14 has a circular counter bore 24, so that the plate 14 may be moved into engagement with the insert projection 20 so as to engage shoulder 26 on plate 12 to shoulder 28 on plate 14. The counterbore is designed to have a depth D to accommodate at least a portion of the projection 20. A fastener 32, which may be threaded 34, and a washer 30, are used to secure the plates together. Specifically, in this embodiment, plate 14 is placed adjacent to plate 12, and projection 20 extends into the counterbore 24, and the plate 14 is moved toward plate 12 until shoulder 28 on plate 14 engages shoulder 26 on plate 12. Threaded fastener 32 is passed through washer 30 and is inserted through aperture 16 until it threadably engages threads 22 in the blind bore 18. The fastener is threadably inserted into threaded engagement until the head 33 of the fastener is in engagement with the washer, thereby securing the plate in place. The mounting structure as described imparts improved structural integrity to dynamically loaded joints.

Figure 2:
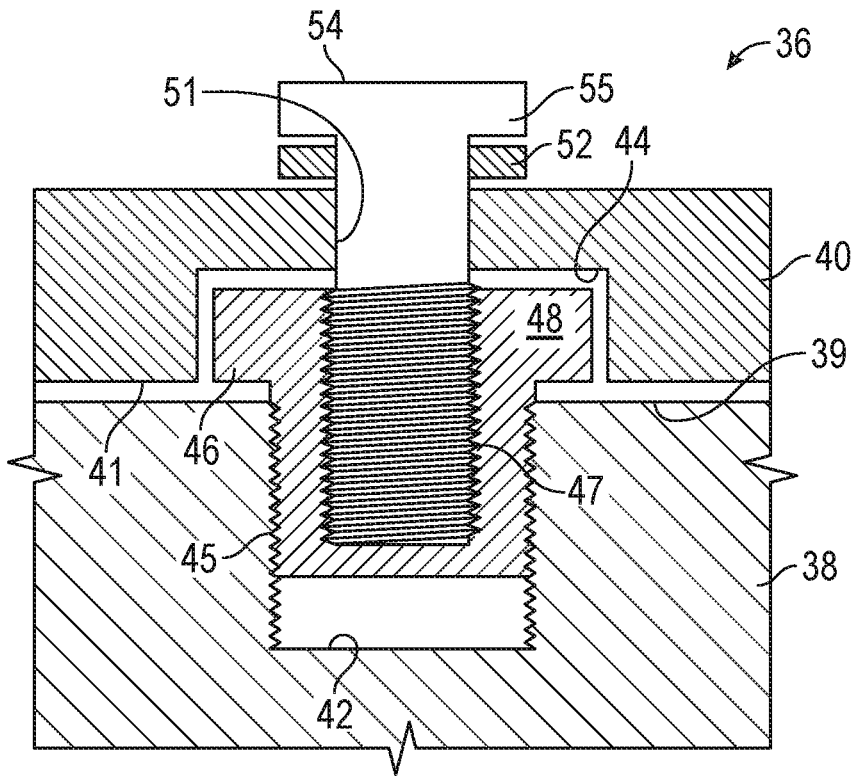
FIG. 2 is a cross-sectional view of another embodiment of the mounting apparatus.

FIG. 2 is a different embodiment of the mounting apparatus. Specifically, mounting structure 36 is shown joining two plates 38 and 40. Plate 38 is equipped with a blind bore 42 and plate 40 is equipped with a circular counterbore 44. An insert 46 having external threads 45 is threaded into engagement with the threaded bore 42 in plate 38 until insert shoulder 48 engages the surface 39 of plate 38. The insert shoulder is of such dimension as to be accommodated within the counterbore in plate 40. Plate 40 is placed in adjacent position to plate 38 such that surface 41 is adjacent to surface 39. A threaded fastener 54, having a head 55, is passed through a washer 52, passed through aperture 51 in plate 40, and threadably engaged with internal threads 47 in the insert, thereby securing the two plates to form a dynamically loaded structural joint.

Figure 3:
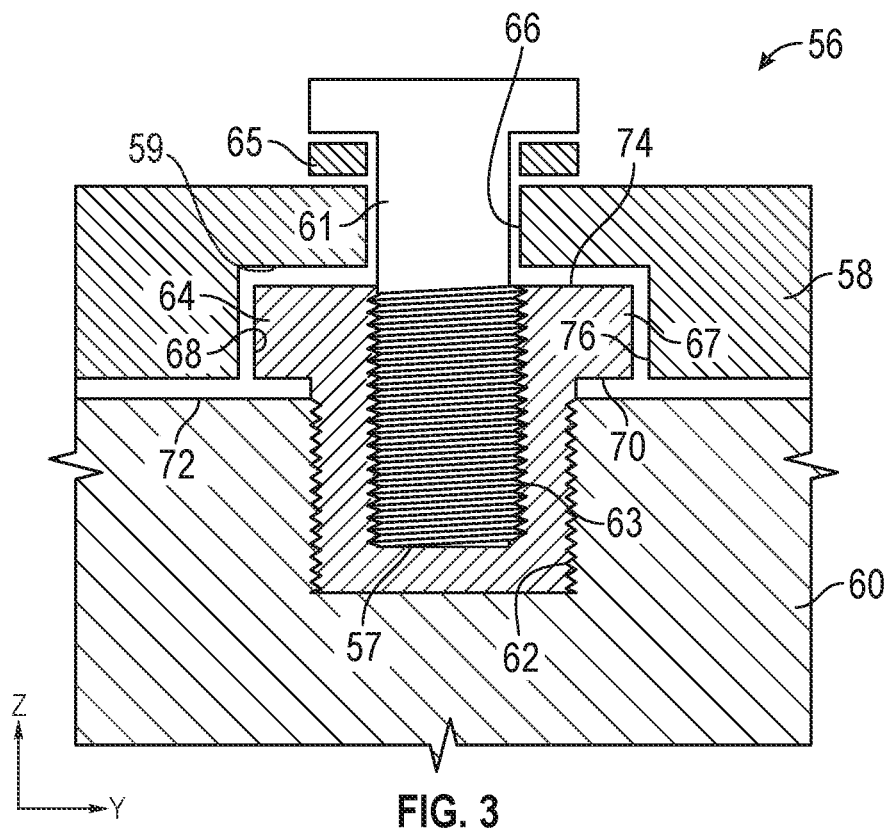
FIG. 3 is a cross-sectional view of another embodiment of the mounting apparatus.
Figure 5:
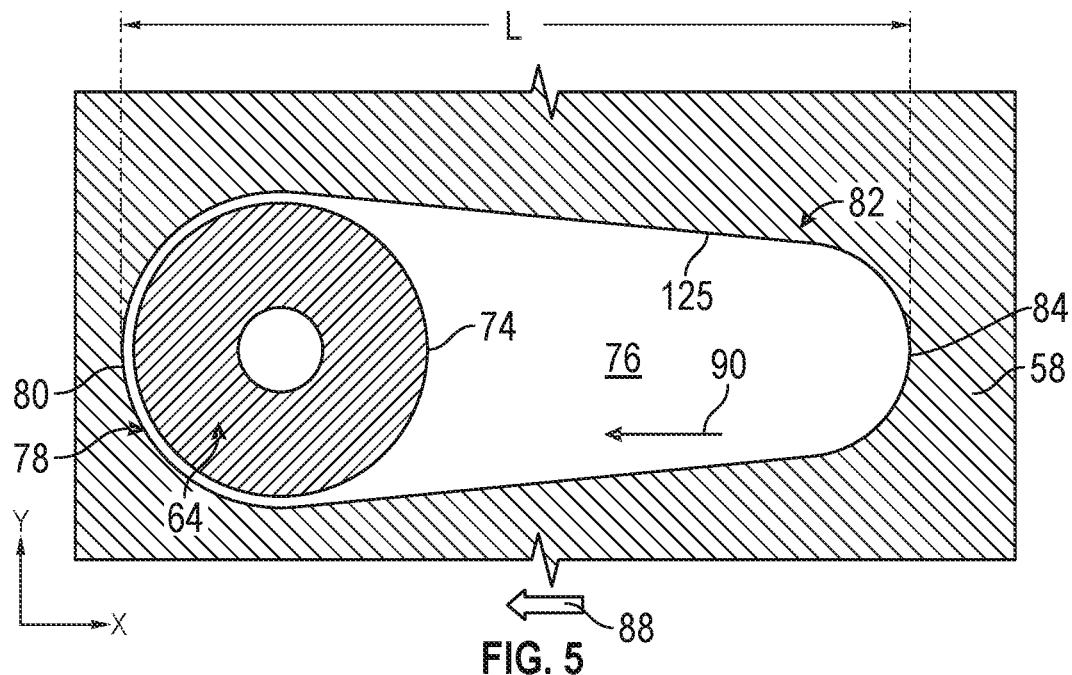
FIG. 5 is a cross-sectional top view of the mounting apparatus showing an insert within a counterbore in the apparatus of FIG. 3.

FIG. 3 is another embodiment of the mounting apparatus. In this embodiment, mounting apparatus 56 comprises two plates 58 and 60, held in clamping relationship by fastener 61. Fastener 61, which may have threads 57, may be passed through washer 65. Plate 58 has an aperture 66 through which the fastener 61 may be inserted. Plate 60 is equipped with a threaded blind bore 62, into which may be threaded insert 64. The insert 64 has a threaded aperture 63 into which the fastener 61 may be cooperatively threaded. Insert 64 has shoulder 67 which, when the insert is fully threaded into the bore, surface 70 on the shoulder may be (but not necessarily) brought into engagement with surface 72 of plate 60. The shoulder 67 is dimensioned such that together they form a diameter or dimension 74, which is accommodated within offset counterbore 76 in plate 58. While FIG. 5 describes the counterbore in plate 58, it is understood that such a counterbore may be in both plates. As seen in FIG. 5, counterbore 76 has a first end 78 with a first diameter or dimension 80 separated by a length L from a second end 82, with a second diameter or dimension 84. Diameter or dimension 80 is greater than size than diameter or dimension 84. Diameter or dimension 80 is of a sufficient size to accommodate the diameter or dimension 74 of threaded insert 64. In this regard, the counterbore may be oblong shape along X-axis (i.e., a direction 90 in FIG. 5). In other embodiments, it is not necessary to have first and second diameters or dimensions in the counterbore 76. In some embodiments, it is possible to have a counterbore that has angular dimensions, such that the first end is of sufficient size to accommodate the diameter or dimension 74, and is of a larger dimension than the second end. When the apparatus of FIGS. 3 and 5 is subjected to shear forces 88, plate 58 moves in the direction 90 (i.e., along the X-axis). As plate 58 moves in the direction 90 (along the X-axis), the offset counterbore moves into engagement with the diameter or dimension 74 of the threaded insert 64. As the force moves the counterbore wall 125 into engagement with the insert diameter or dimension, shear force is dissipated and is energy is absorbed. Material from plate 58 may be deformed in the process to absorb the interaction of the threaded diameter or dimension and the counterbore wall 125 without causing the mounting apparatus to come apart, thereby providing for a dynamically mounted joint. The embodiment of FIG. 3 may result in different clamping arrangements between the plates and the insert and the fastener. One possibility is that, with the insert fully threaded into the bore, and fastener plate 58 clamps with plate 60, and surfaces 70 and 72 are engaged with each other, but surface does not clamp with insert 68. In another embodiment, plate 58 clamps with plate 60 and surfaces 70 and 72 are in engagement with each other. In yet another embodiment, plate 58 and 60 are clamped together, and the threaded insert may engage the counterbore surface 59.

Figure 4:
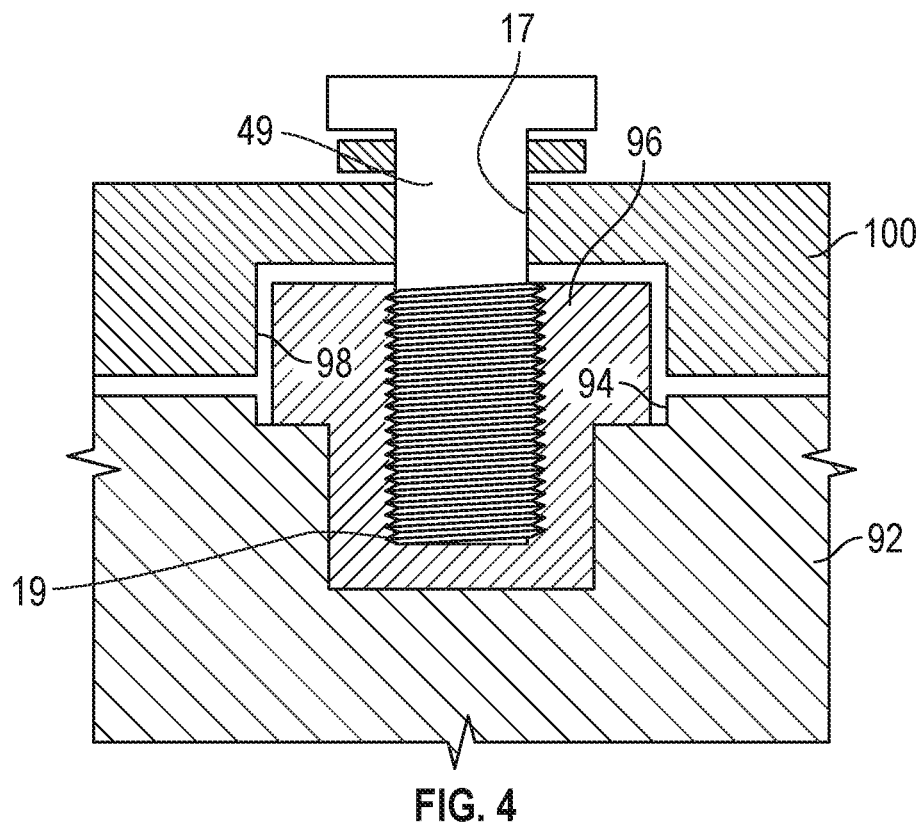
FIG. 4 is a cross-sectional view of another embodiment of the mounting apparatus.

FIG. 4 is another embodiment of the mounting structure of FIGS. 3 and 5, wherein plate 92 has a counter bore 94 to accommodate the insert 96. In this embodiment, the insert, which may be threaded, engages both the counterbore 94 of plate 92, but also engages counterbore 98 of plate 100 when the apparatus is subjected to dynamic forces as described with reference to FIG. 3 and FIG. 5. Thus the insert as shown in FIG. 4 does not experience stress riser issues at the insert shoulder, and when assembled, the mounting apparatus couples plates 100 to 92 through the insert 96 when the fastener 49 is passed through aperture 17 and threaded into the insert as at 19. It is understood that in this embodiment, both plate 92 and 100 may have a counterbore similar to that as described in FIG. 5. Those skilled in the art also appreciate that the tapered slot as described in the previous figures may both be rounded counterbores in plates 92 and 100.

Figure 6:
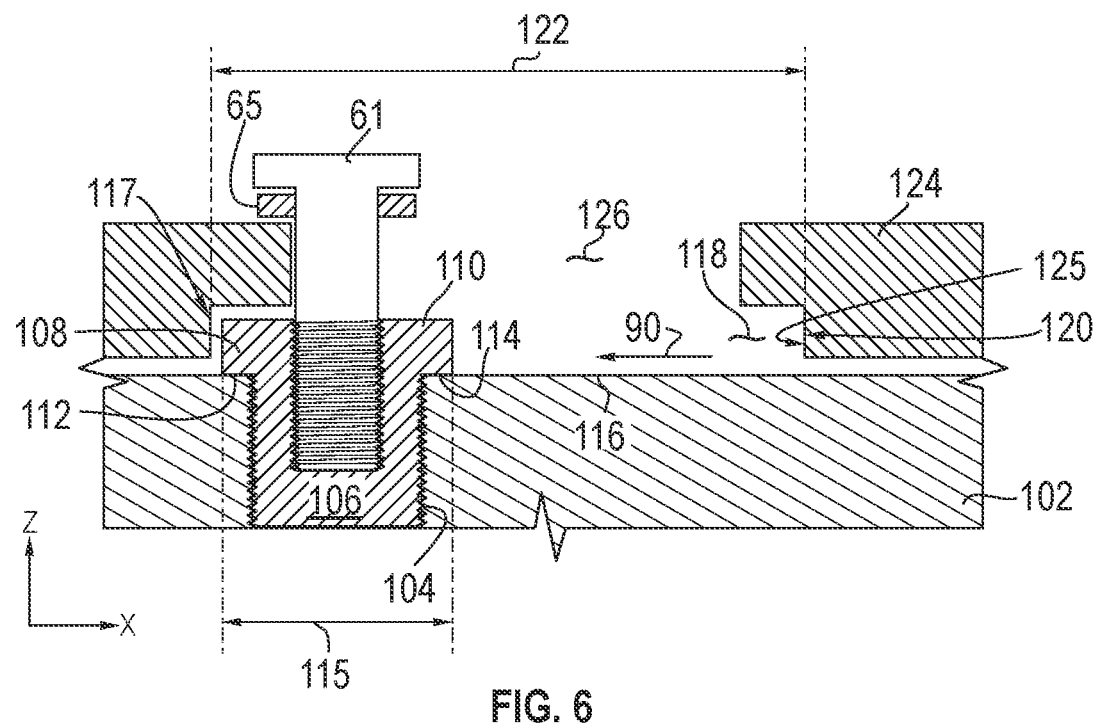
FIG. 6 is a cross-sectional side view of another embodiment of the mounting apparatus with a counterbore.
Figure 7:
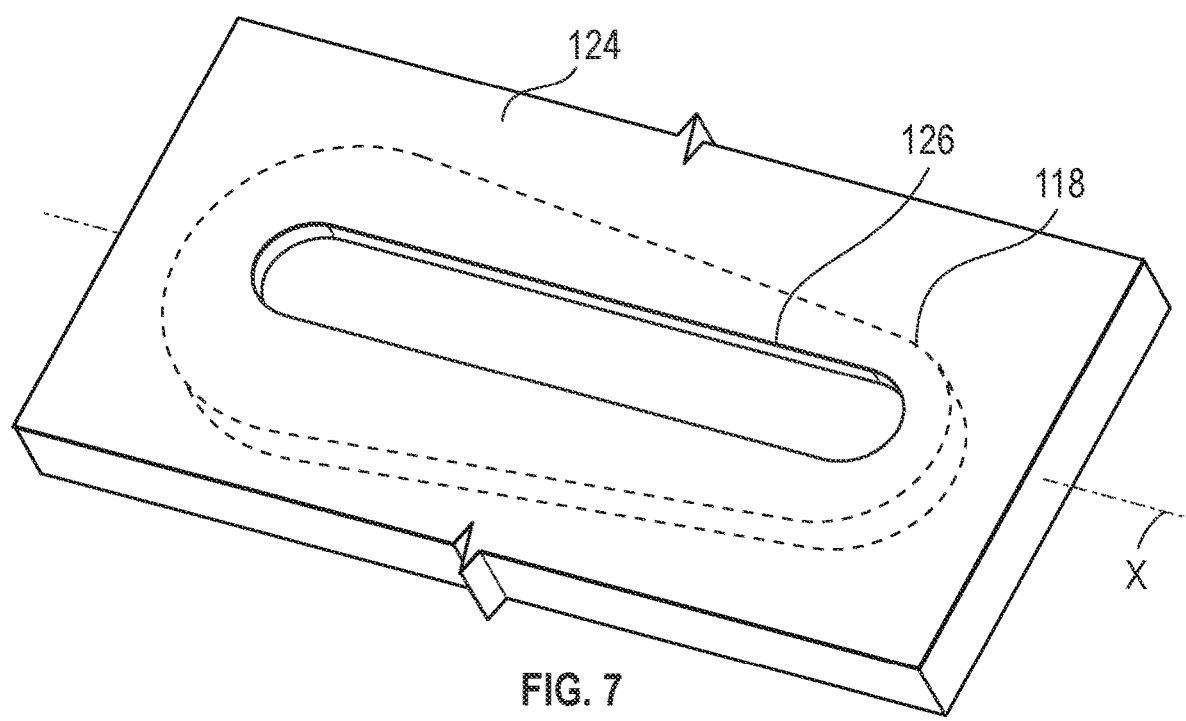
FIG. 7 is a perspective top view of a plate having an aperture and a counterbore of FIGS. 3 and 6.
Figure 8:
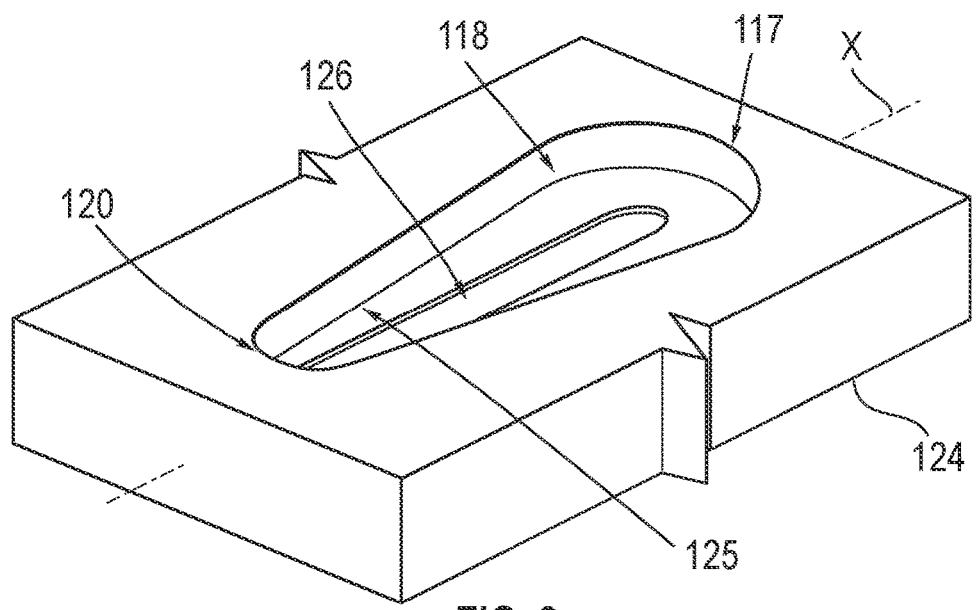
FIG. 8 is a perspective bottom view of a plate having an aperture and a counterbore of FIGS. 3 and 6.

FIG. 6 is a cross-sectional view of a dynamically loaded joint, showing a side view of the interaction of the threaded insert diameter and a pocket (which has similar configurations of FIGS. 3 and 5). For example, in this embodiment of the present disclosure, the mounting apparatus comprises two plates (i.e., two members) 102 and 124, held in clamping relationship by fastener 61 as shown in FIG. 3. The fastener 61 having threads may be passed through washer 65. The plate 124 has an aperture 126 through which the fastener 61 may be inserted. Further, plate 124 has an elongated slot 126 and a counterbore (see FIGS. 7 and 8) to receive the fastener 61 and the insert 106 respectively, and plate 102 has an aperture 104 into which is placed insert 106. In accordance with another embodiment of the present disclosure, the plate 102 may have a blind bore (for example, see FIG. 3). Insert 106 has shoulders 108 and 110, with surfaces 112 and 114 which, when the insert is placed into the aperture 104, engage surface 116 on plate 102. Those skilled in the art understand that both shoulders 108 and 110 are formed by the diameter 115 of the insert 106, and are called out as separate numbers merely for clarity. Similarly, the surfaces depicted as 112 and 114 are actually the same surface in a top view, but are called by separate reference numbers in this side view.

The shoulders form an insert diameter or dimension 115, which is accommodated by a first diameter or dimension 117 in a pocket 118 (i.e., a counterbore). The pocket 118 has a second diameter or dimension 120 separated from the first diameter or dimension by a length 122. The second diameter or dimension is smaller than the first diameter or dimension. In this regard, the structure as described is also seen in FIG. 5. Motion between the two plates 102 and 124 causes the diameter or dimension of the insert to contact and interact with the side walls 125 (see FIG. 5) in the pocket until the motion of one plate relative to the other is stopped by interaction of the insert with the sides of the pocket. Further, the aperture 126 of the plate 124 is formed with an elongated slot along the direction 90 (i.e., X-axis) such that an impact force causes the first plate to move relative to the second plate. Accordingly, the insert 106 moves within the tapered counterbore from the first dimension 117 to the second dimension 120 along the direction 90 (i.e., X-axis), and the fastener also moves within the elongated slot along the X-axis. In general, the slot length of the aperture 126 is smaller than the length of the pocket 118 (counterbore) in the X-axis. As the one plate moves in the direction 90 (i.e., along the X-axis) in relation to the other, it encounters shear forces 88 (as shown in FIG. 5) until the energy is absorbed, thereby relieving the motion between the plates without separating the dynamically loaded structure.

Any of the described mounting structures may be used for joining dynamically loaded structures. One piece of structure is attached to another piece of structure with a bolt and an insert that is mechanically loaded as a result of translational movement of the two pieces of structure. The insert may be threaded or otherwise joined, such as a physical/chemical bonding, or a press fit, or a friction weld) into the main piece of structure, and, may have internal threads for attachment and a shoulder feature that sits on the surface of the one of the structures. The other piece of the structure (mating structure) has a counterbore that fits over the shoulder of the insert that transfers load when translation occurs along the X-axis (i.e., a transverse direction relative to the insertion direction (Z-axis) of the fastener between the two structures (members) to be joined. A fastener, such as a bolt, threads into the internal thread of the insert holding two pieces of structure together along the Z-axis. In one embodiment, the configuration of the counterbore depth is tolerance such that the clamp load provided by the bolt clamps the two members together. The counterbore may be oblong, tapered or circular shape along the X-axis. An oblong counterbore allows for the members to be joined at an angle and will load the fastener and counterbore in three directions and the fastener in one direction. The mounting structures as described may be tuned as one might tune a shear pin, so that it could be constructed to take certain forces without failure but fail if those forces are exceeded.

The tolerances of the fastener, insert major diameter and counterbore diameter can be utilized to adjust the load sharing between the fastener (bolt) and the insert. The fastener can be utilized to adjust the load sharing between the fastener and the insert. The insert can be comprised of different materials dependent on the properties required. To maximize the energy the joint can transmit, a fastener with superb elongation and energy to failure properties may be selected.

The mounting structures as described may be suited for structural joints and may be selected for use in the application of under armor to eliminate the need for a puck on the inside face of the structure. The insert is threaded into the structure and can be replaced without reworking the base structure. The mounting apparatus as described can be utilized to reduce weight by allowing for the use of smaller fasteners (bolts). In additional the shear strength and tensile strength of the joint can be tuned independently by varying the sizes of the engaged counterbore and the fastener (bolt). Joints may be designed to have different shear strength in different directions by shaping of the counterbore.

Although the steps of the above-described processes have been exemplified as occurring in a certain sequence, such processes could be practiced with the steps performed in a different order. It should also be understood that certain steps could be performed simultaneously, that other steps could be added, or that certain steps could be omitted. In other words, the descriptions of the processes are provided for the purpose of illustration, and should not limit the claimed invention.

Accordingly, it is to be understood that the above description is intended to be illustrative and not restrictive. Many embodiments and applications other than the examples provided would be apparent upon reading the disclosure. The scope of the invention should be determined with reference to the appended claims along with the full scope of equivalents. It is intended that future developments will occur, and that embodiments of the disclosed systems and methods will incorporate and be incorporated with such future developments.

Use of singular articles such as "a," "the," "said" together with an element means one or more of the element unless a claim expressly recites to the contrary.

What is claimed is:

1. A mounting structure apparatus, comprising:
a first member having a first surface and a second surface opposite to the first surface, the first member having an elongated slot formed in the first surface along a longitudinal axis (X-axis) and a counterbore formed in the second surface along the longitudinal axis (X-axis) such that the X-axis of the elongated slot is aligned with the X-axis of the counterbore;
a second member having a bore facing the second surface of the first member and communicating with the counterbore of the first member;
an insert having a shoulder and a blind bore, the insert engageable with the counterbore of the first member and the bore of the second member; and
a fastener configured to insert into the elongated slot of the first member and engaged with the blind bore of the insert such that the fastener is indirectly coupled with the bore of the second member to join the first member to the second member,
wherein the counterbore of the first member is formed with a peripheral wall enclosed by the second surface, and the shoulder of the insert and the fastener are configured to slide along the longitudinal axes of the elongated slot and the counterbore of the first member, and
wherein the counterbore has a first dimension to accommodate the insert and a second dimension smaller than a diameter of the insert, and the second dimension is separated from the first dimension by a length L along the X-axis such that the counterbore of the first member is tapered from the first dimension to the second dimension along the X-axis, and whereby the insert is configured to interfere with the counterbore in the event that the first and second members are moved relative to each other.

2. The mounting structure apparatus of claim 1, wherein the insert forms a threaded bore and external threads, the external insert threads engageable with threads in the bore of the second member, and the threaded bore engages the fastener.

3. The mounting structure apparatus of claim 1, wherein the counterbore of the first member is formed with an oblong or elongated tapered shape along the X-axis.

4. The mounting structure apparatus of claim 1, wherein a slot length of the aperture elongated slot is smaller than a length of the counterbore along the X-axis.

5. The mounting structure apparatus of claim 1, wherein the elongated slot of the first member comprises a peripheral wall fully enclosed by the first surface.

6. A mounting structure apparatus, comprising:
- a first member having a first surface and a second surface opposite to the first surface, the first member having an elongated slot formed in the first surface along a longitudinal axis and aligned with a counterbore formed in the second surface along the longitudinal axis;
- a second member having a bore facing the second surface of the first member and communicating with the counterbore of the first member;
- an insert having a blind bore, the insert engageable with the counterbore of the first member and the bore of the second member; and
- a fastener configured to insert into the elongated slot of the first member and engaged with the blind bore of the insert such that the fastener is indirectly coupled with the bore of the second member to join the first member to the second member,
- wherein the counterbore of the first member is formed with a peripheral wall enclosed by the second surface, and the insert and the fastener are configured to slide along the longitudinal axes of the elongated slot and the counterbore of the first member, and
- wherein the counterbore of the first member is formed with an elongated tapered slot having a first dimension to accommodate the insert and a second dimension smaller than a diameter of the insert, and the second dimension is separated from the first dimension by a length along the longitudinal axis, and whereby the insert is configured to interfere with the counterbore in the event that the first and second member are moved relative to each other.

7. The mounting structure apparatus of claim 6, wherein a slot length of the elongated slot is smaller than a length of the counterbore in along the X-axis.

8. The mounting structure apparatus of claim 6, wherein the elongated slot of the first member comprises a peripheral wall fully enclosed by the first surface.

* * * * *